US007626959B2

(12) United States Patent
Dietz et al.

(10) Patent No.: US 7,626,959 B2
(45) Date of Patent: *Dec. 1, 2009

(54) WIRELESS TELECOMMUNICATIONS SYSTEM FOR ACCESSING INFORMATION FROM THE WORLD WIDE WEB BY MOBILE WIRELESS COMPUTERS THROUGH A COMBINATION OF CELLULAR TELECOMMUNICATIONS AND SATELLITE BROADCASTING

(75) Inventors: Timothy Alan Dietz, Austin, TX (US); Anthony Cappa Spielberg, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/143,958

(22) Filed: Jun. 23, 2008

(65) Prior Publication Data

US 2008/0274733 A1 Nov. 6, 2008

Related U.S. Application Data

(63) Continuation of application No. 11/122,743, filed on May 5, 2005, now Pat. No. 7,414,987.

(51) Int. Cl.
*H04B 7/185* (2006.01)
*H04H 20/74* (2008.01)
*H04B 7/00* (2006.01)
*H04W 4/00* (2009.01)

(52) U.S. Cl. ............... 370/316; 455/3.02; 455/41.2; 455/427; 455/12.1

(58) Field of Classification Search ............... 370/316; 455/3.02, 41.2, 427, 12.1
See application file for complete search history.

(56) References Cited

U.S. PATENT DOCUMENTS

2005/0215194 A1* 9/2005 Boling et al. ............... 455/3.02
2005/0239399 A1* 10/2005 Karabinis .................. 455/3.02
2005/0251455 A1* 11/2005 Boesen ....................... 705/26
2007/0129019 A1* 6/2007 Otten et al. .................. 455/73

* cited by examiner

*Primary Examiner*—Barry W Taylor
(74) *Attorney, Agent, or Firm*—Steven L. Bennett; Jerry B. Kraft

(57) ABSTRACT

A hybrid cellular telephonic and satellite radio broadcast system for enabling a wireless mobile computer to rapidly and effectively access information from the Web. The combination of a mobile wireless receiving computer, with wireless cellular telecommunication associated with the receiving computer for transmitting a request for data from the receiving computer to the Web, an implementation for accessing the requested data from the Web, a satellite transponder, wireless communication for transmitting said accessed requested data to the satellite transponder, an implementation on the satellite transponder for broadcasting the accessed requested data and apparatus in the mobile wireless receiving computer for receiving the broadcast data.

9 Claims, 4 Drawing Sheets

WIRELESS TELECOMMUNICATIONS SYSTEM FOR ACCESSING INFORMATION FROM THE WORLD WIDE WEB BY MOBILE WIRELESS COMPUTERS THROUGH A COMBINATION OF CELLULAR TELECOMMUNICATIONS AND SATELLITE BROADCASTING

TECHNICAL FIELD

The present invention relates to telecommunications through mobile wireless computer devices to access information from the World Wide Web (Web) using both cellular telecommunication and communication satellite broadcasts.

BACKGROUND OF RELATED ART

With the globalization of business, industry and trade wherein transactions and activities within these fields have been changing from localized organizations to diverse transactions over the face of the world, the telecommunication industries have, accordingly, been expanding rapidly. Wireless telephones and, particularly, cellular telephones have become so pervasive that their world wide number is in the order of hundreds of millions.

The wireless telephone industry's rapid expansion has driven cellular telecommunications in all related wireless industries. Consequently, the principles of the invention would be applicable to any wireless personal communication device and services that could be used to communicate in a cellular telecommunications system. These would include the wide variety of currently available communicating personal palm devices or Personal Digital Assistants (PDAs), that include, for example, Hewlett-Packard's iPAQ devices, Palmone's Palm devices and Research in Motion Limited's Blackberry devices. In addition, wireless telecommunication services are expanding into the cellular wireless laptop and notebook personal computers. The cellular wireless telecommunications industry is seeking new and expanded uses for its products and business services. In recent years, cellular wireless telecommunications has made significant advances in the accessing of data from the Web or Internet for mobile wireless computer devices. However, direct cellular telecommunications with the Web have yielded results of limited satisfaction. Cellular telephony does not provide the high speed data transfer often required for the downloading of the great quantities of information generated by Web search requests. Also, cellular telephone bandwidth still remains relatively expensive.

As will be described hereinafter, the present invention makes use of satellite radio technology for receiving broadcasts to compensate for these shortcomings of cellular telephony in receiving high speed data. Satellite radio receiving technology has been developing over the past decade until the present when hand held receivers are mass marketed for broadcasts from two private communication satellite systems owned by SiriusRadio and XMRadio. These portable receivers would be readily integratable into the mobile wireless receiving computers, as will hereinafter be described with respect to the present invention.

However, at this point, some background information on satellite radio receivers is appropriate. The U.S. Federal Communications Commission (FCC) has allocated a spectrum in the "S" band (2.3 GHz) for Nationwide U.S. broadcasting of satellite based Digital Audio Radio Service (DARS). XM Satellite radio, for example, uses two satellites placed in parallel geostationary orbit, which is about 22,223 miles above Earth, and is the type of orbit most commonly used for communications satellites. There is a radio uplink to these two GEO satellites from a ground radio station which then bounce the signals down to the receivers on the ground. In urban areas where buildings can block out the satellite, the system may be supplemented by supporting ground transmitters. Each receiver contains appropriate hardware and software for decoding received coded/secure broadcasts. The portable satellite radio receivers have been reduced in size until they presently use antennae the size of cellular telephone antennae.

SUMMARY OF THE PRESENT INVENTION

The present invention provides a hybrid cellular telephonic and satellite radio broadcast system for enabling a wireless mobile computer to rapidly and effectively access information from the Web or Internet (used interchangeably). This wireless telecommunication system comprises the combination of a mobile wireless receiving computer, wireless cellular telecommunication means associated with the receiving computer for transmitting a request for data from the receiving computer to the Web, means for accessing the requested data from the Web, a satellite transponder, wireless telecommunication means for transmitting said accessed requested data to the satellite transponder, means on the satellite transponder for broadcasting the accessed requested data and means in the mobile wireless receiving computer for receiving the broadcast data.

The wireless cellular telecommunications means may be built into the mobile wireless computer. In this case, the wireless computer with built-in cellular telecommunications device could be any wireless personal communication device and services that could be used to communicate in a cellular telecommunications system. These would include the wide variety of currently available communicating personal palm devices or PDAs, that include, for example, Hewlett-Packard's iPAQ devices, Palmone's Palm devices and Research in Motion Limited's Blackberry devices.

On the other hand, the wireless cellular telecommunications means could be connected to said receiving computer through short range RF communications. The data accessed from the Web in response to a data request from a receiving station could then be transmitted to a satellite uplink station for transmitting data to the satellite transponder whereby that accessed data is transmitted to said satellite. The system could also provide security for securing said accessed requested data in the satellite transponder broadcast only to the said receiving station requesting said data.

BRIEF DESCRIPTION OF THE DRAWINGS

The present invention will be better understood and its numerous objects and advantages will become more apparent to those skilled in the art by reference to the following drawings, in conjunction with the accompanying specification, in which.

DETAILED DESCRIPTION OF THE PREFERRED EMBODIMENT

Figure 1:
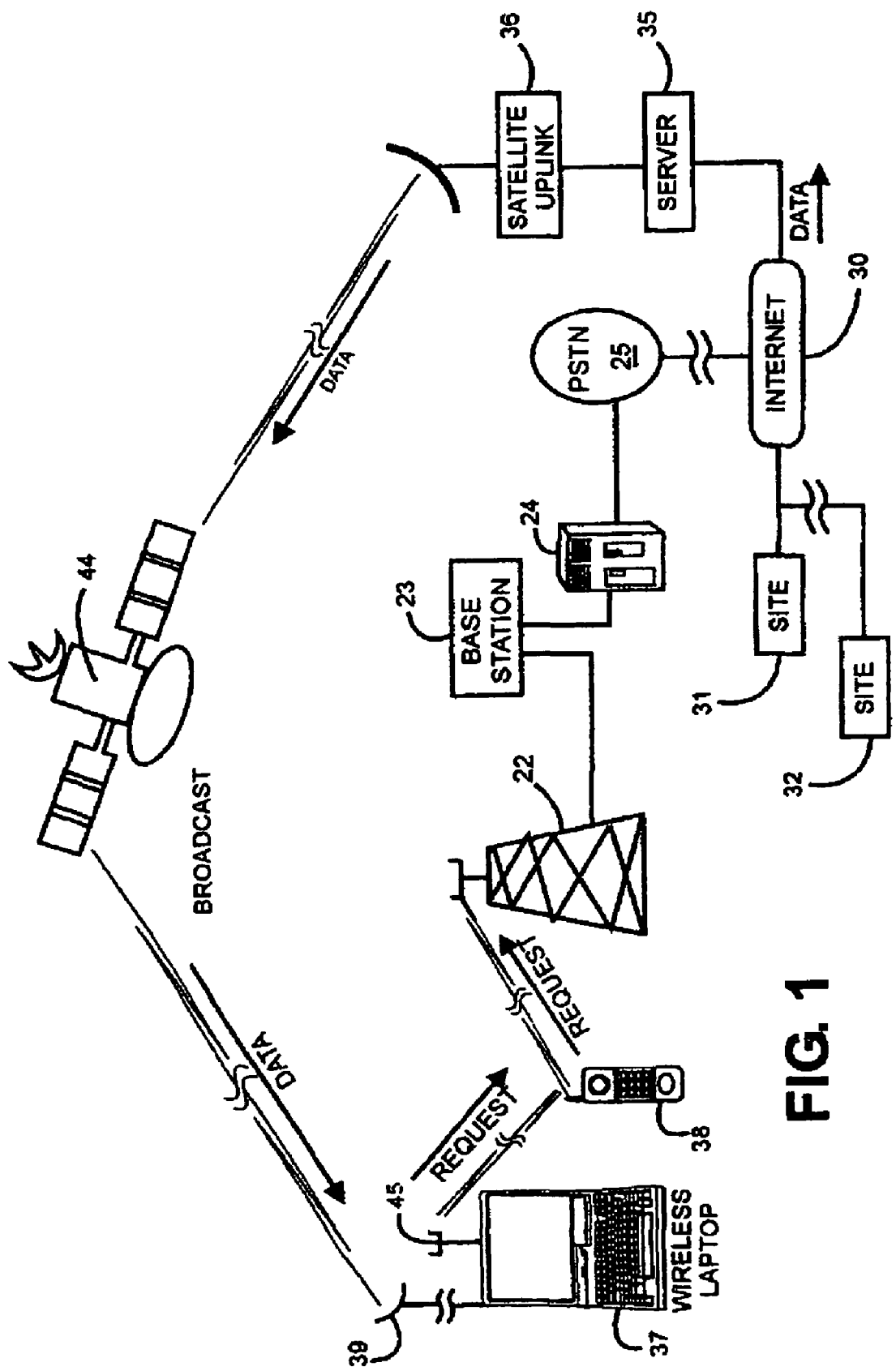
FIG. 1 is a block diagram of a generalized data processing system including a processor unit that provides the hybrid cellular telecommunications and satellite system of the present invention for enabling a wireless mobile computer to rapidly and effectively access information from the Web.

Referring to FIG. 1, there is shown a generalized diagrammatic view of a portion of a cellular telephone network connected into a conventional Public Switched Telephone Network (PSTN) 25 showing channel paths to and from a mobile wireless receiving computer, e.g. laptop or notebook computer 37 wirelessly (e.g. short range RF) to cellular PDA or cellular telephone 38 that, in turn, is wirelessly connected to cellular tower 22 that, in turn, is connected via base station 23 and switching node 24 to PSTN 25.

At this point, some general background information on cellular telephone systems should be reviewed in order for the invention to be better understood. The principal forms of telecommunication should be briefly considered. The standard wired telecommunications system, which has been in use world wide for well over 100 years, is the conventional hand held or speaker input wired into a base that, in turn, is wired into a PSTN with wired switched channel paths to and from other telephones or like devices through their bases. These telephones are respectively connected to the PSTN via local switching centers or switching nodes in a fully wired telecommunication system. Conventionally, these switching centers have many telephones connected to each other. The centers operate to control the channel connections, i.e. switch into and out of the PSTN, those calls originated or terminated at telephone stations.

In addition, there have been developed over the past 20 years two major mobile wireless systems: 1) the short range wireless radio frequency (RF) "cordless" telephone system; and 2) the mobile wireless long range RF "wireless" telephone system that has been commercialized primarily as the "cellular" telephone or telecommunications systems.

Before the cellular wireless phone system was developed, long range mobile wireless phones were relatively rudimentary and were usually in automobiles. There was usually one central tower with about 25 channels available on the tower. The mobile wireless telephone needed a large powerful transmitter, usually in the automobile that had to transmit up to 50 miles. This was too cumbersome for any personal or portable phone. In the cellular telecommunications systems for the mobile wireless telephones and receiving devices, an area such as a city is broken up into small area cells. Each cell is about 10 square miles in area. Each has its base station that has a tower for receiving/transmitting and a base connected into PSTN. Even though a typical carrier is allotted about 1000 frequency channels, the creation of the cells permit extensive frequency reuse so that tens of thousands of people in the city can be using their cellular telecommunications systems simultaneously. Cellular telecommunications systems, particularly those used in the present invention, are now preferably digital with each cell having over 160 available channels for assignment to users. In a large city, there may be hundreds of cells each with its tower and base station. Because of the number of towers and users per carrier, each carrier has a Mobile Telephone Switching Office (MTSO) that controls all of the base stations in the city or region and controls all of the connections to the land based PSTN. When a client cell phone gets an incoming call, MTSO tries to locate what cell the client mobile phone is in. The MTSO then assigns a frequency pair for the call to the cell phone. The MTSO then communicates with the client over a control channel to tell the client or user what frequency channels to use. Once the user phone and its respective cell tower are connected, the call is on between the cell phone and tower via two-way long range RF communication. In the United States, cell phones are assigned frequencies in the 824-894 MHz ranges.

Referring again now to FIG. 1, the present invention takes advantage of the already existent cellular wireless telecommunications network infrastructure. As previously mentioned, the wireless laptop 37 could include a standard cellular telephonic transceiver that enables it to communicate directly with the nearest cellular tower 22. However, for the present example, we will assume that the mobile wireless laptop has no telephonic transceiver and has to send cellular requests for Web data through a cellular telephonic device 38 that has a cellular type transceiver. The wireless laptop needs to access the Web so as to send a request for data. The laptop 37 has a short range RF transceiver that sends such range signal to a short range RF transceiver in cellular telephone 38, e.g. the respective transceivers may operate using conventional IEEE 802.11 short range RF protocols. The IEEE 802.11 wireless transmission protocols are discussed in greater detail at pp. 60-62 in the text, *Peter Norton's Complete Guide to Networking*, SAMS Division of MacMillan Computer Publishing, Indianapolis, Ind., 1999, pp. 49-62, as well as in the article, *A Wireless Local Area Network Protocol That Improves Throughput Via Adaptive Control*, B. E. Mullins et al., *Proceedings of the IEEE International Conference on Communications*, pp. 1427-1431, June 1997. The cellular telephone relays the request for Internet data via tower 22, base station 23, switching node 24, PSTN 25, which is then conventionally connected to the Web or Internet 30, from which the requested data is accessed via server 35, for example. The packet of data accessed from the Web 30. This data is then sent via the above described satellite 36 to an appropriate satellite 44 from which the data is then broadcast using the above described satellite communications. The wireless mobile computer 37 receives the satellite data feed via antenna 39 and decodes the broadcast data to provide the accessed requested data to laptop 37.

Figure 2:
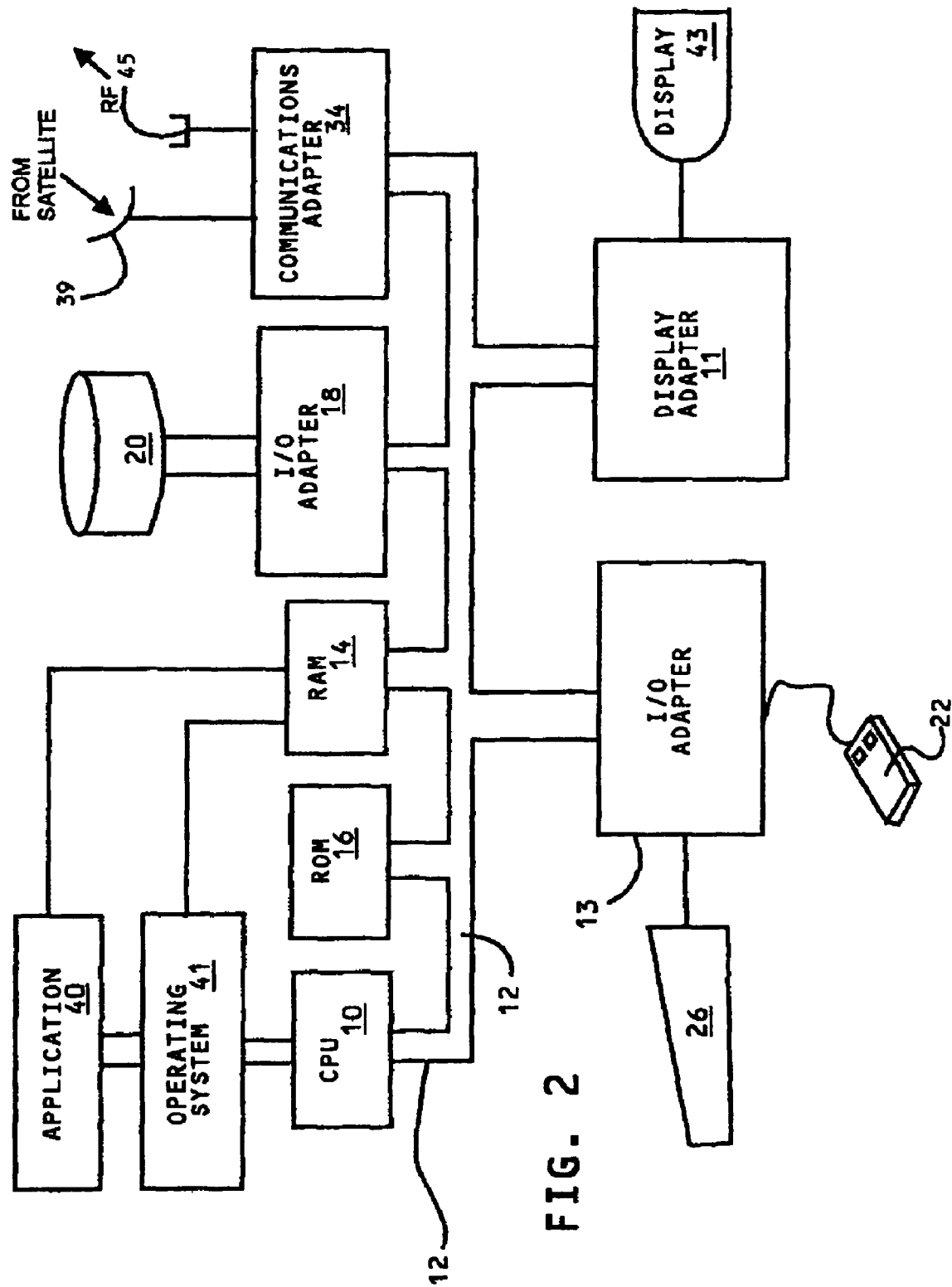
FIG. 2 is a block diagram of a generalized data processing system, including a processor unit that may function as the receiving wireless computer controlling the cellular wireless requests for Web information as well as the computer control of the wireless receiving apparatus for the satellite transmissions of the present invention.

With respect to FIG. 2, there will be described operations involved in the present invention. Such operations are carried out at the mobile wireless computer. Thus, they are primarily controlled by a data processing system of the mobile computer 37 (FIG. 1) under the control of a central processing unit 10, (FIG. 2) which, in turn, is interconnected to various other components by system bus 12. An operating system 41 that runs on processor 10 provides control and is used to coordinate the functions of the various components of the control system. The OS 41 is stored in Random Access Memory (RAM) 14. The application programs 40 for the functions including those of the present invention are moved into and out of RAM 14 to perform their respective functions. These programs include the programs of the present invention enabling a wireless mobile computer to rapidly and effectively access information from the Web through the combination of wirelessly transmitting requests for Web data via cellular telephonic systems, and receiving accessed requested data via communication satellite broadcasts. These programs may be implemented in conventional Web browser programs for accessing Web data. RAM 14, and I/O adapter 18 are also interconnected to system bus 12. I/O adapter 18 communicates with the disk storage device 20. Communications adapter 34 interconnects bus 12 with an outside network enabling the data processing system to communicate wirelessly through network connections via cellular telephonics and satellite broadcast as described with respect to FIG. 1. The various network programming feeds to and from antenna 45 for RF connection to the cellular transceiver, and satellite receiver antenna 39 are connected to system bus 12 via suitable communications adapters 34. A conventional computer display 43 connected via a display adapter 11 is available for the display of monitoring and control functions. A system like that of FIG. 2 may be used in the wireless laptop computer 37 in FIG. 1.

Figure 3:
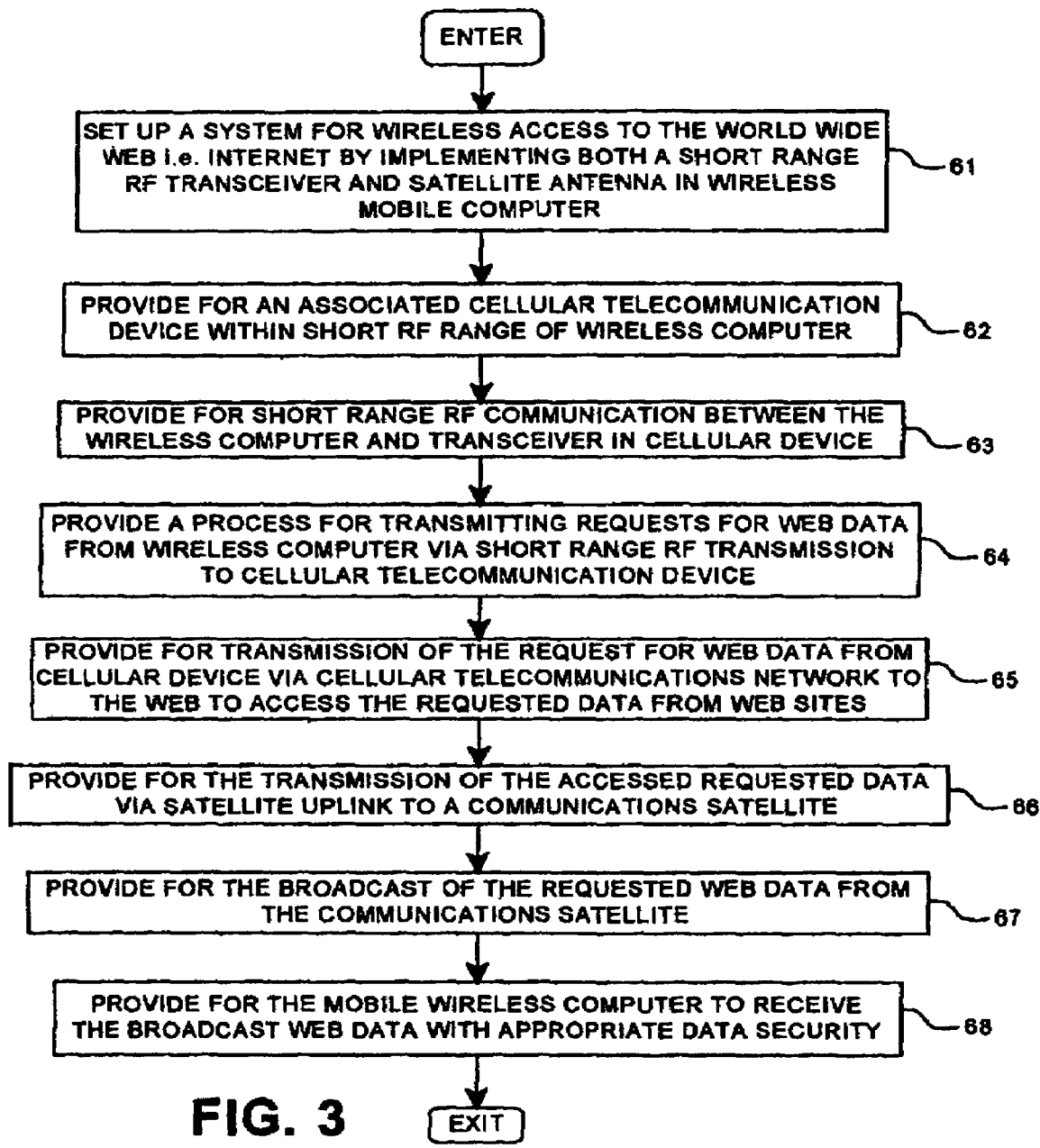
FIG. 3 is an illustrative flowchart describing the setting up of the elements needed for the program of the invention for the hybrid cellular telecommunications and satellite system of the present invention for enabling a wireless mobile computer to rapidly and effectively access information from the Web.

FIG. 3 is a flowchart showing the development of a process according to the present invention for the setting up of a computer programming structure for enabling a wireless mobile computer to rapidly and effectively access information from the Web through the combination of wirelessly transmitting requests for Web data via cellular telephonic systems, and receiving accessed requested data via communication satellite broadcasts.

In a mobile wireless computer, there is incorporated a short range RF transceiver, as well as a satellite antenna for receiving satellite broadcasts, step 61. An associated cellular telecommunications device, e.g. cellular telephone, is provided within short range of the wireless computer, step 62. Then, short range RF communication between the wireless computer and a transceiver in the cellular device is provided for, step 63. Along this path, a procedure for transmitting requests for Web data from the wireless computer via short range RF transmission to the cellular communications device, step 64. Then, provision is made for conventionally transmitting a request for Web data from the cellular device via cellular network to the Web to access Web data from appropriate Web sites, step 65. Provision is made for the transmission of the accessed Web data via satellite uplink to a communications satellite, step 66. Provision is made for the broadcast of the requested Web data from the communications satellite, step 67. Then, provision is made for the broadcasted data to be received at the wireless mobile computer with appropriate security, step 68, to complete the Web data accessing transaction, step 68.

Figure 4:
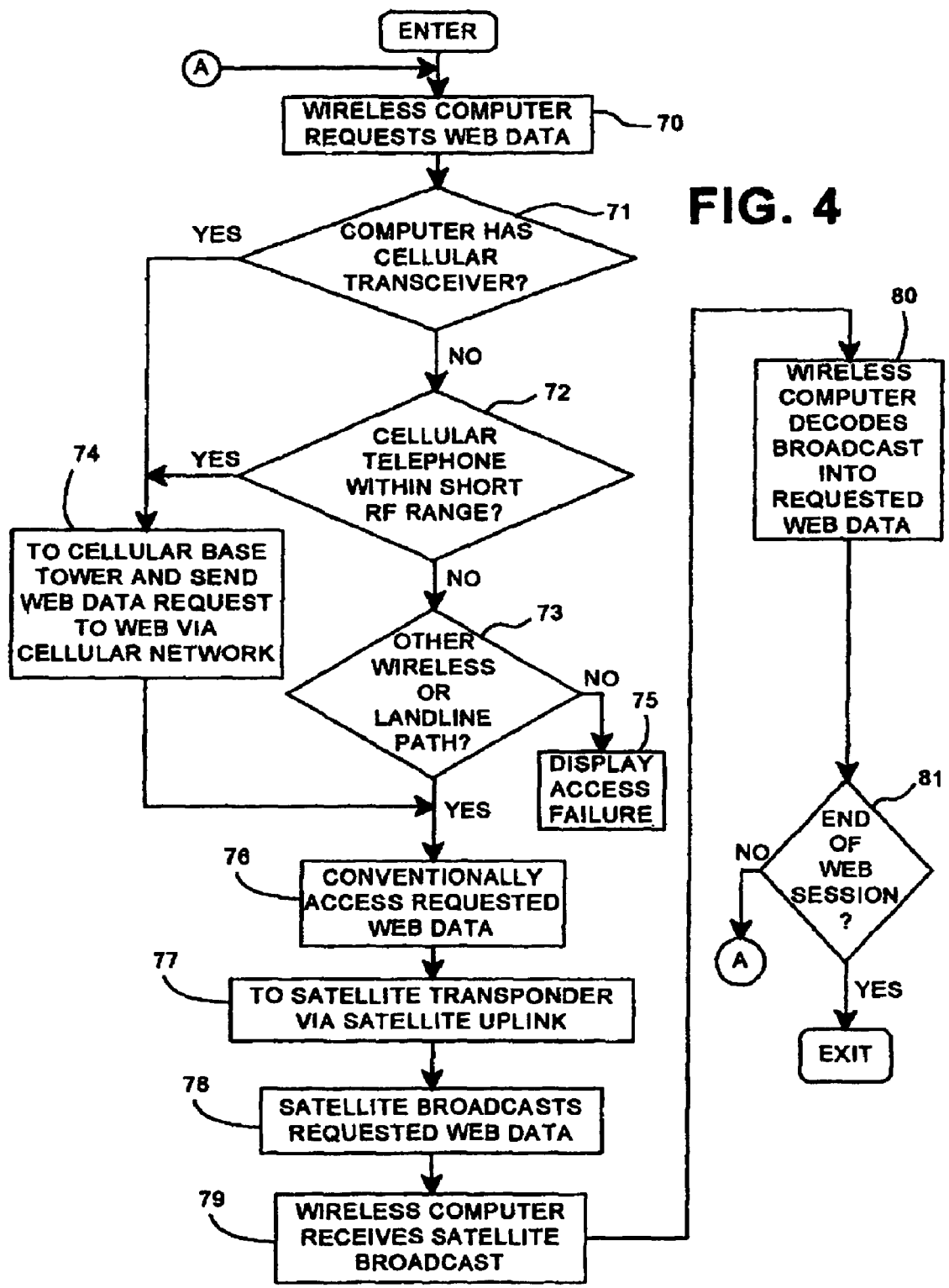
FIG. 4 is a flowchart of an illustrative simplified run of the program set up in FIG. 3.

A simplified illustrative running of the process set up in FIG. 3 will now be described with respect to the flowchart of FIG. 4. First, step 70, the wireless computer requests Web data. A determination may be made as to whether the wireless computer has the cellular transceiver required for cellular communication on-board, step 71. If Yes, then the request is transmitted via the nearest cellular base tower and then to the Web via the cellular network, step 74. If No, then a further determination is made as to whether there is a compatible cellular device within the short RF range required for the short range RF communication (assuming that the mobile wireless device has an appropriate transceiver for short range RF communications), step 72. If Yes, the request is sent via short range transmission to the cellular device and then transmitted via the nearest cellular base tower and then to the Web via the cellular network, step 74. If step 72 has a No decision, then a further determination is made, step 73, whether the requesting computer has any alternate wireless or land line path to the Web. If No, there is an appropriate message displayed on the wireless computer of failure to access the Web, step 75. If Yes, or after step 74, the requested Web data is conventionally accessed, step 76, and transmitted to a communications satellite via a satellite uplink, step 77. The requested Web data is broadcast from the satellite (appropriately encoded by any selected conventional implementation), step 78, and received by the requesting mobile wireless computer, step 79. The receiving wireless computer decodes the broadcast data into the request Web data, step 80. At this point, a determination may be made as to whether the Web access session is to be terminated, step 81. If Yes, the session is exited. If No, the process is returned to step 70 via branch "A".

One of the preferred implementations of the present invention is in application program 40 made up of programming steps or instructions resident in RAM 14, FIG. 1, of the receiving wireless computer. Until required by the computer system, the program instructions may be stored in another readable medium, e.g. in disk drive 20, or in a removable memory, such as an optical disk for use in a CD ROM computer input or in a floppy disk for use in a floppy disk drive computer input. Further, the program instructions may be stored in the memory of another computer prior to use in the system of the present invention and transmitted over a Wide Area Network (WAN), such as the Web itself, when required by the user of the present invention. One skilled in the art should appreciate that the processes controlling the present invention are capable of being distributed in the form of computer readable media of a variety of forms.

Although certain preferred embodiments have been shown and described, it will be understood that many changes and modifications may be made therein without departing from the scope and intent of the appended claims.

What is claimed is:

1. A wireless telecommunications system for the rapid access of information from the World Wide Web (Web) comprising:

a mobile wireless receiving computer;

wireless cellular telecommunication means wirelessly connected to said receiving computer through shore range RF communications for transmitting a request for data from said receiving computer to the Web;

means for accessing said requested data from the Web;

a satellite transponder;

wireless telecommunication means for transmitting said accessed requested data to said satellite transponder;

means on the satellite transponder for broadcasting said accessed requested data;

security means for securing said accessed requested data in the satellite transponder broadcast only to the said receiving computer requesting said data; and means in said mobile wireless receiving computer for receiving said broadcast data.

2. The wireless telecommunications system of claim 1 further including;

a satellite uplink station for transmitting data to said satellite transponder; and means for transmitting said accessed requested data via the Web to said satellite uplink station whereby said accessed data is transmitted to said satellite.

3. The wireless telecommunications system of claim 1 wherein:

said mobile wireless receiving computer is a display computer, and said accessed requested data is displayed.

4. The wireless telecommunications system of claim 3 wherein:

said means for accessing said requested data access said data from a Web site; and said accessed is displayed as a Web document.

5. The wireless telecommunications system of claim 1 wherein said wireless cellular telecommunications means is connected to said receiving computer through a short range RF communication using 802.11 standard protocols.

6. A computer usable medium having scored Thereon a computer readable program for the rapid access of information from the World Wide Web (Web) Through wireless communication, wherein the computer program when executed on a computer causes The computer to:

wirelessly connect a mobile wireless receiving computer to a cellular telephone Through short range RF communication;

transmit a request for data from said mobile wireless receiving computer via wireless cellular telecommunication to the Web;

access said requested data from the Web;

wirelessly transmit said accessed requested data to a satellite transponder;

broadcast said accessed requested data from the satellite transponder;

secure said accessed requested data in the satellite transponder broadcast only to the said receiving computer requesting said data; and receive said broadcast data in said mobile wireless receiving computer.

7. The computer usable medium of claim 6 wherein the computer program when executed further causes the computer to:

access said requested data from a Web site; and display said requested data as a Web document.

8. The computer usable medium of claim 6 wherein said receiving computer is wirelessly connected to said cellular telephone through short range RF communication using 802.11 standard protocols 9. The computer usable medium of claim 6, wherein said receiving computer is a display computer, and the computer program when executed causes the receiving computer to display said requested data.

* * * * *